No. 861,388. PATENTED JULY 30, 1907.
W. M. POWER.
CHANGE SPEED GEARING.
APPLICATION FILED APR. 15, 1905.
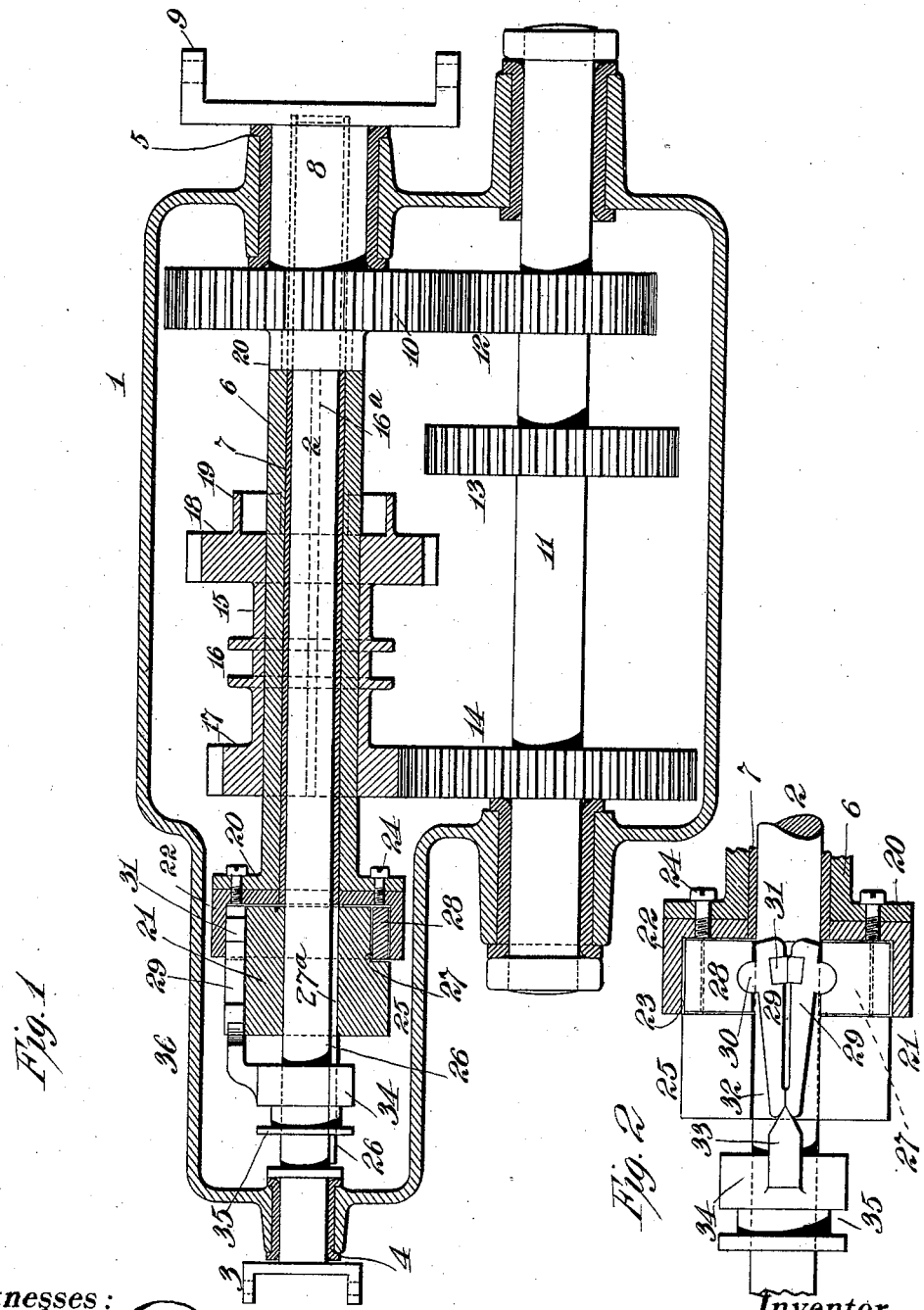
Witnesses:
Inventor
William M. Power
By his Attorneys

UNITED STATES PATENT OFFICE.

WILLIAM M. POWER, OF PORT CHESTER, NEW YORK.

CHANGE-SPEED GEARING.

No. 861,388.	Specification of Letters Patent.	Patented July 30, 1907.

Application filed April 15, 1905. Serial No. 255,749.

*To all whom it may concern:*

Be it known that I, WILLIAM M. POWER, a citizen of the United States, and a resident of Port Chester, Westchester county, State of New York, have invented a certain new and useful Improvement in Change-Speed Gearing, of which the following is a specification.

The object I have in view is the production of a speed gearing suitable for automobiles, which will be extremely efficient, compact, light, simple and cheap to construct. I attain these objects by the mechanism illustrated in the accompanying drawings, in which, Figure 1 is a plan view of a gearing embodying my invention, shown partly in section; and Fig. 2 is a detail view of the clutch, slightly enlarged, and also partly in section.

In both views like parts are designated by the same reference characters.

The invention comprises a change speed gearing of the sliding gear type, in connection with a friction clutch, all being compactly grouped together, and all being arranged within the same dust proof, oil retaining casing.

The necessary moving parts of the sliding gear transmission mechanism, and the friction clutch will be lubricated by the same oil contained within the casing. The clutch will also be protected from dust, and accident, and there will be no necessity of additional bearings between it and the gearing. The structure will therefore have a minimum of length and weight. Another and very important point in connection with this device is that the clutch is reduced to the smallest practical size, consequently its weight and the resulting inertia is reduced.

The practical objection to a clutch outside of the gear casing and of the customary size is that owing to its weight it possesses a considerable amount of inertia, which will have the result in shifting from one speed to another of damaging and causing excessive wear upon the edges of the teeth of the sliding gears. In my invention by employing a small clutch such as shown and described, the inertia of the parts is reduced to the smallest possible amount, consequently when shifting from one speed to another the teeth of the gears are caused to engage without undue shock and the amount of wear and damage is reduced to a minimum. This desirable result is facilitated by placing the clutch within the gear casing as by such construction the usual connecting shaft between the clutch and the gear is dispensed with and its weight and consequent inertia is done away with.

In carrying out my invention I provide a casing 1 within which both the change speed gearing and the clutch are contained. This casing is dust proof and is liquid proof so that it will carry the necessary amount of lubricating oil for the gears, the clutch and the shafts bearings. In the drawings, 2 is the main shaft connected to the motor by means of the coupling 3. This shaft is mounted in a bearing 4, at one end, and a bushing shown in dotted lines, within a sleeve 8, the latter being mounted within a bearing 5, both bearings being carried by the casing. Surrounding the shaft is a sleeve 6 separated therefrom by means of a bushing 7 so that it will rotate upon the shaft without substantial frictional loss. Upon the shaft 2 is a sleeve 8, carried upon a second bushing so as to turn freely upon the shaft. This sleeve is mounted within the bearing 5 and is provided outside of the casing 1 with a coupling 9, for connecting to the driven machinery. Within the side of the casing the sleeve 8 carries a gear heel 10.

The second or auxiliary shaft 11 is carried in bearings within the casing 1 and has gears 12, 13, 14, connected thereto so as to rotate therewith. Three gears are shown in the drawing, but the number may be increased or diminished as desired. One of these gears 12 is arranged to always be in mesh with the gear 10 on the first shaft 2.

Upon the sleeve 6 is carried a spool 15 having a groove 16 for attachment of the fork or other means for sliding it upon the sleeve 6. A feather $16^a$ (four in number) carried by the sleeve 6, insures that the sleeves will always rotate together, and at the same time permits the sleeve 15 to be slid along the sleeve 6. Also carried by the spool are gears 17 and 18. These gears are of such size that they will intermesh respectively with the gear wheels 14 and 13, upon the spool 15 being slid along the sleeve 6. The gear 18 carries a portion of the jaw members 19 of a jaw clutch, the other members 20 being carried by the gear 10. This clutch will be locked upon the spool 15 being moved to the extreme right of the figure. The structure already described constitutes a form of sliding gear speed changing transmission mechanism. This form of change speed gearing is well known, and is very satisfactory in operation.

The sleeve 6 is provided with a flange 20 to which is bolted the friction clutch indicated generally by the character 21. This friction clutch comprises a cylindrical body 22 having an internal annular face 23. This body is secured to the flange 20 by means of bolts 24. In connection with the body 22 is a second body 25, preferably of less diameter than the body 22, and secured to the shaft 2. The mode of securing is preferably by means of a key 26. The body 25 has a reduced portion 27. Surrounding this reduced portion is a ring 28. The ring is not continuous but a space is left open between its ends, see Fig. 2, to permit the introduction of the expanding mechanism. The ends of the ring 28 are provided with semi-circular recesses which engage with similar shaped projections 30 carried by the levers 29. The opposite faces of the levers are provided with hard metal bearing blocks 31 which abut together. The arrangement of the levers is such that upon their free ends being separated the blocks 31 will roll upon their opposing faces, separating the ends of the ring 28 and engaging it with the annular surface 23 of the body 22. The levers 29 are mounted in a slot 32 formed in the body 25 so that they will be retained in position. A key 27$^a$ is placed opposite the expanding mechanism and rotary movement of the ring 28 will be prevented. The body 25 being secured to the shaft 2, will form a coupling with the sleeve 6. The levers 29 are separated by means of a wedge 33 carried by the sleeve 34 having a groove 35 for attachment of a fork or other means for moving it. This sleeve 34 is rotated with the shaft 2 by means of a suitable feather, which may be an extension of the key 26. Upon the sleeve 34 being moved toward the body of the clutch the wedge 33 entering between the free ends of the levers 29 will separate them and the ring 28 will be thereby expanded engaging with the outward annular surface 23 of the body 22, thus coupling the parts of the clutch together.

The clutch 21 is located within the casing 1 preferably in an extension 36 connected thereto. This extension is preferably formed integrally with the rest of the walls of the casing 1. The end wall of the extension carries the bearing for the shaft 2. By providing the extension merely sufficiently large for the reception of the clutch, the weight of the structure is reduced and its bulk correspondingly reduced.

Having thus described my invention what I claim and desire to secure by Letters Patent, is:—

In a change speed gearing, the combination of a casing, a transmission gearing of the sliding gear type within the casing, a body having an annular internal face, secured to the transmission gearing and surrounding the main shaft of the transmission gearing, a second body connected to the shaft, and levers on the second body, an expanding ring between the two bodies, and adapted to engage with the annular face, and a sleeve sliding upon the shaft, and carrying a wedge, located between the levers, for separating them, and expanding the ring, all of these parts being contained within the casing.

This specification signed and witnessed this tenth day of April, 1905.

WILLIAM M. POWER.

Witnesses:
  LEONARD H. DYER,
  JNO. ROBT. TAYLOR.